(12) United States Patent
Herman et al.

(10) Patent No.: US 10,783,496 B2
(45) Date of Patent: Sep. 22, 2020

(54) BALANCED INFORMATION SYSTEM

(71) Applicant: ADP, LLC, Roseland, NJ (US)

(72) Inventors: Matthew Paul Herman, Hoboken, NJ (US); Omar Scott, New York, NY (US); Hadar Yacobovitz, New York, NY (US)

(73) Assignee: ADP, LLC, Roseland, NJ (US)

( * ) Notice: Subject to any disclaimer, the term of this patent is extended or adjusted under 35 U.S.C. 154(b) by 1046 days.

(21) Appl. No.: 14/740,618

(22) Filed: Jun. 16, 2015

(65) Prior Publication Data

US 2016/0371652 A1   Dec. 22, 2016

(51) Int. Cl.
G06Q 10/06       (2012.01)
G06Q 10/10       (2012.01)

(52) U.S. Cl.
CPC . *G06Q 10/1053* (2013.01); *G06Q 10/063112* (2013.01)

(58) Field of Classification Search
CPC ............... G06Q 10/00; G06Q 30/02; G06Q 10/063112; G06Q 10/06398
USPC ............................................. 705/7.11–7.42
See application file for complete search history.

(56) References Cited

U.S. PATENT DOCUMENTS

| 7,149,698 | B2 | 12/2006 | Guheen et al. |
| 7,747,719 | B1 | 6/2010 | Horvitz et al. |
| 8,135,711 | B2 | 3/2012 | Charnock et al. |
| 8,762,870 | B2 | 6/2014 | Robotham et al. |
| 2003/0154212 | A1 | 8/2003 | Schirmer et al. |
| 2004/0002887 | A1* | 1/2004 | Fliess ............ G06Q 10/063112 705/7.14 |
| 2007/0046675 | A1* | 3/2007 | Iguchi ............... G06T 11/206 345/441 |
| 2011/0054968 | A1 | 3/2011 | Galaviz |
| 2014/0278633 | A1* | 9/2014 | Daly ............. G06Q 10/063112 705/7.14 |
| 2014/0358607 | A1* | 12/2014 | Gupta ........... G06Q 10/063112 705/7.14 |
| 2015/0066554 | A1* | 3/2015 | Red ............... G06Q 10/063112 705/7.14 |
| 2015/0088567 | A1* | 3/2015 | Lambroschini ........................ G06Q 10/063112 705/7.14 |

(Continued)

OTHER PUBLICATIONS

Rafaeli et al., Off the Radar: Comparative Evaluation of Radial Visualization Solutions for Composite Indicators, IEEE Transactions on Visualization and Computer Graphics, vol. 22, No. 1, Jan. 2016, pp. 569-577 (Year: 2016).*

(Continued)

*Primary Examiner* — Robert D Rines
(74) *Attorney, Agent, or Firm* — Yee & Associates, P.C.

(57) ABSTRACT

A method, computer system, and computer program product for analyzing skills. The method identifies the skills for a group of people and displays the skills identified on a radar chart in a graphical user interface in a display system. The radar chart has axes extending from a common origin in which a skill in the skills for a person in the group of people is displayed on an axis in the axes corresponding to the skill. A balance of skills is identified for the group of people. The balance of skills has desired values for the skills needed for the group of people. The balance of skills for the group of people is displayed in the radar chart.

25 Claims, 11 Drawing Sheets

(56) References Cited

U.S. PATENT DOCUMENTS

2015/0127400 A1\* 5/2015 Chan .............. G06Q 10/063112
                                                                     705/7.14
2016/0275434 A1\* 9/2016 Briganti ........... G06Q 10/06398

OTHER PUBLICATIONS

"Radar (Spider) Chart," FusionCharts.com, InfoSoft Global Private Limited, copyright 2002-2015, 5 pages, accessed May 27, 2015. http://www.fusioncharts.com/chart-primers/radar-chart/.

\* cited by examiner

BALANCED INFORMATION SYSTEM

BACKGROUND INFORMATION

1. Field

The present disclosure relates generally to an improved computer system and, in particular, to a method and apparatus for accessing information in a computer system. Still more particularly, the present disclosure relates to a method and apparatus for visualizing information in a computer system.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to hire new employees, assign employees to projects, perform reviews for employees, and other suitable operations for the organization. As another example, a research department in the organization may use an information system to store and analyze information to research new products, analyze products, or for other suitable operations.

Currently used information systems include databases. These databases store information about the organization. For example, these databases store information about employees, products, research, product analysis, business plans, and other information about the organization.

Information about the employees may be searched and viewed to perform various operations within an organization. However, this type of information in currently used databases may be cumbersome and difficult to visualize and manipulate based on the manner in which responses to queries to the databases are made. For example, combining information about employees may be desirable for performing operations such as identifying new hires, selecting teams for projects, and other operations in the organization. As a result, errors may occur in the analysis of the information and more time than desired may be needed to obtain desired information or combine information about the employees from a database in an information system.

Spreadsheets or reports may be created to help in the analysis of information about employees. Information from a database may be exported to a spreadsheet, and a user may enter or modify the information in the spreadsheet. Spreadsheets may also be merged to combine information. Using spreadsheets to analyze or combine information may still be more difficult and cumbersome than desired.

For example, when searching for a person to fill a position or selecting people to form teams in an organization, information about the skills of candidates for a position or a team are considered. As the number of potential candidates for new positions or teams increases, the analysis of the information in the spreadsheets becomes more difficult. Further, as the number of skills considered for the position or the team increases, the analysis of the information also becomes more difficult.

In some cases, bar charts or line charts may be generated from the spreadsheets to visually display information about candidates from the database. For example, an overall score based on skills and other factors for potential hires or existing employees may be made and displayed on bar or line charts.

These types of visualizations may be helpful but do not provide details about the skills of candidates for new positions or teams. If it is desirable to see additional information, such as a level of skills for candidates, the increased number of variables on bar charts or line charts makes visualizing the information more difficult than desired.

Therefore, it would be desirable to have a method and apparatus that take into account at least some of the issues discussed above, as well as other possible issues. For example, it would be desirable to have a method and apparatus that overcome the technical problem of visualizing skills of candidates using charts.

SUMMARY

An embodiment of the present disclosure provides a method for analyzing skills. The method identifies the skills for a group of people and displays the skills identified on a radar chart in a graphical user interface in a display system. The radar chart has axes extending from a common origin in which a skill in the skills for a person in the group of people is displayed on an axis in the axes corresponding to the skill. The method identifies a balance of skills for the group of people. The balance of skills has desired values for the skills needed for the group of people. The method then displays the balance of skills for the group of people in the radar chart.

Another embodiment of the present disclosure provides a computer system comprising a display system and a radar chart system in communication with the display system. The radar chart system identifies skills for a group of people and displays the skills identified on a radar chart in a graphical user interface in the display system. The radar chart has axes extending from a common origin in which a skill in the skills for a person in the group of people is displayed on an axis in the axes corresponding to the skill. The radar chart system also identifies a balance of skills for the group of people. The balance of skills has desired values for the skills needed for the group of people. Further, the radar chart system displays the balance of skills for the group of people in the radar chart, enabling analyzing the skills through the balance of skills displayed in the radar chart.

Yet another embodiment of the present disclosure provides a computer program product for analyzing skills comprising a computer readable storage media, and first program code, second program code, third program code, and fourth program code stored on the computer readable storage media. The first program code identifies the skills for a group of people. The second program code displays the skills identified on a radar chart in a graphical user interface in a display system. The radar chart has axes extending from a common origin in which a skill in the skills for a person in the group of people is displayed on an axis in the axes corresponding to the skill. The third program code identifies a balance of skills for the group of people. The balance of skills has desired values for the skills needed for the group of people. The fourth program code displays the balance of skills for the group of people in the radar chart, enabling analyzing the skills through the balance of skills displayed in the radar chart.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that a radar chart may provide a better visualization of information as compared to a bar chart or a line chart. For example, values for skills may be displayed on axes of the radar chart for a candidate being considered for a position. The position may be a new position or may fill a current position. The position may be one in a team of people.

The illustrative embodiments also recognize and take into account that a radar chart may increase the ease at which information, such as skills, is visualized for comparison of candidates. The illustrative embodiments also recognize and take into account that identifying skills that may be desirable for a position may still be more difficult than desired even though comparisons of candidates may be more easily made through the use of a radar chart.

Thus, the illustrative embodiments provide a method and apparatus for analyzing skills of candidates for positions. In one illustrative example, skills are identified for a group of people. The skills identified are displayed on a radar chart having axes extending from a common origin in which a skill for a person in the group of people is displayed as a point on an axis corresponding to the skill. A balance of the skills for the group of people is identified. The balance of skills identifies desired values for skills needed for the group people. The balance of the skills for the group of people is displayed on the radar chart.

Figure 1:
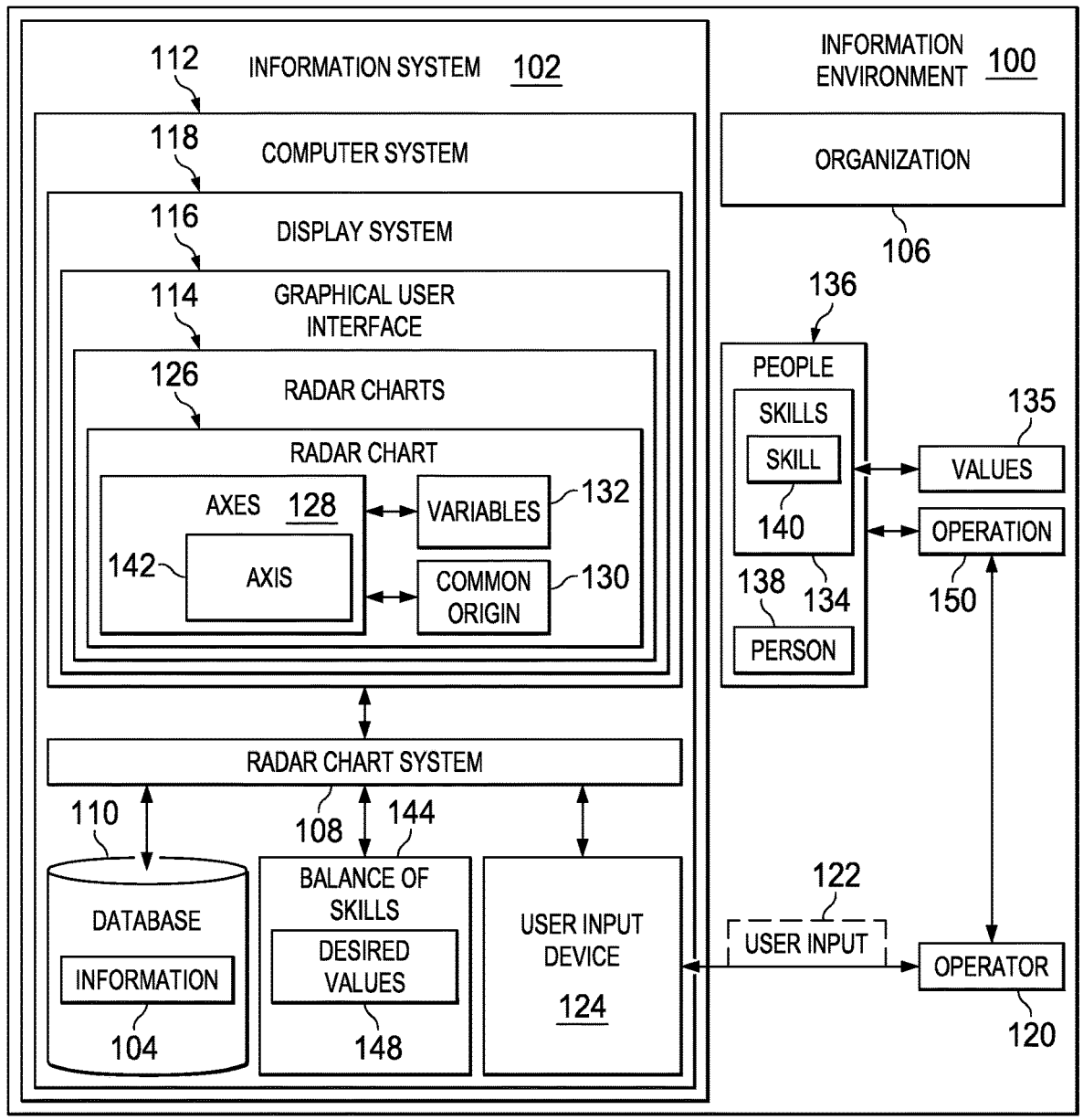
FIG. 1 is an illustration of a block diagram of an information environment in accordance with an illustrative embodiment.

With reference now to the figures and, in particular, with reference to FIG. 1, an illustration of a block diagram of an information environment is depicted in accordance with an illustrative embodiment. In this illustrative example, information environment 100 includes information system 102. Information system 102 manages information 104 about organization 106.

Organization 106 may be, for example, a corporation, a partnership, a charitable organization, a city, a government agency, or some other suitable type of organization. Information 104 about organization 106 may include, for example, at least one of information about people, products, research, product analysis, business plans, financials, or other information relating to organization 106.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Information system 102 may take different forms. For example, information system 102 may be selected from one of an employee information system, a research information system, a sales information system, an accounting system, a payroll system, a human resources system, or some other type of information system that stores and provides access to information 104 about organization 106.

In this illustrative example, information system 102 includes different components. As depicted, information system 102 includes radar chart system 108 and database 110. Radar chart system 108 and database 110 may be implemented in computer system 112.

As depicted, radar chart system 108 provides access to information 104 using radar charts 114 that are displayed in graphical user interface 116 in display system 118 in computer system 112. Radar chart system 108 may be implemented in software, hardware, firmware, or a combination thereof. When software is used, the operations performed by radar chart system 108 may be implemented in program code configured to run on hardware, such as a processor unit. When firmware is used, the operations performed by radar chart system 108 may be implemented in program code and data and stored in persistent memory to run on a processor unit. When hardware is employed, the hardware may include circuits that operate to perform the operations in radar chart system 108.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 112 is a hardware system and includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

As depicted, display system 118 is a hardware system and includes one or more display devices on which graphical user interface 116 may be displayed. Operator 120 is a person who may interact with graphical user interface 116 through user input 122 generated by user input device 124 in computer system 112. User input device 124 may be, for example, a mouse, a keyboard, a trackball, a touchscreen, a stylus, or some other suitable type of input device.

In the illustrative example, radar chart system 108 provides access to information 104 in different forms. For example, the access may be selected from at least one of reading, writing, or modifying information 104. As depicted, this access is facilitated through the use of radar charts 114 displayed in graphical user interface 116.

As depicted, radar chart system 108 displays radar chart 126 in radar charts 114 with axes 128 extending from common origin 130. Axes 128 correspond to variables 132. In this illustrative example, variables 132 are skills 134.

In this example, skills 134 have values 135. Values 135 are used to quantify skills 134. For example, values 135 are numerical values such as a number, an integer, a percentage, a fraction, or some other suitable type of numerical value.

In this manner, skills 134 for a first person may be compared to skills 134 for a second person. For example, management may be a skill that both the first person and the second person have. The numerical value may be a rating that is assigned to a person. Management for the first person may be a nine while management for the second person may be a seven. As a result, a comparison of the management skill between the first person and the second person can be made.

As another example, the numerical value may be an identification of years of experience. For example, the skill may be education. The numerical value assigned to education may indicate the amount of education. For example, the numerical values may be assigned with a college degree=1, a masters degree=2, and a doctorate=3. The numerical values also may be assigned based on the discipline for the degree with respect to a particular job, team, or other factor.

Radar chart system 108 identifies skills 134 for a group of people 136. Skills 134 may be selected from at least one of technical knowledge, management, meeting deadlines, problem solving, communication, language, education, or other suitable types of skills 134. In this illustrative example, skills 134 are identified from information 104 about people 136 in database 110.

The group of people 136 is one or more persons in people 136 for which skills 134 are to be visualized on radar chart 126. This visualization is made for purposes of comparing the group of people 136. In the illustrative example, the group of people 136 may be, for example, a number of people 136 or a subgroup of people 136. As used herein, "a number of," when used with reference to items, means one or more items. Additionally, a subgroup of people 136 is two or more of people 136. Skills 134 are represented for the subgroup like a person on radar chart 126. The subgroup may be a team, a department, or some other grouping of people 136.

As depicted, person 138 in people 136 may be in organization 106. In other illustrative examples, person 138 may be outside organization 106.

As depicted, radar chart system 108 displays skills 134 identified on radar chart 126 in graphical user interface 116 in display system 118. Radar chart 126 has axes 128 extending from common origin 130 in which skill 140 in skills 134 for a person in the group of people 136 is displayed on axis 142 in axes 128 corresponding to skill 140. In other words, each of skills 134 for each person in the group of people 136 is displayed on axes 128 in radar chart 126.

Radar chart system 108 identifies balance of skills 144 for the group of people 136. As depicted, balance of skills 144 has desired values 148 for skills 134 needed for the group of people 136. For example, balance of skills 144 with desired values 148 for skills 134 means that a person with balance of skills 144 added to the group of people 136 results in the group of people 136 having a desired proportion of skills 134.

For example, desired values 148 for skills 134 may be values that are desired for skills 134 in a person that is to be added to the group of people 136. In one example, balance of skills 144 is skills 134 having desired values 148 for selecting a new person to add to group of people 136.

Radar chart system 108 displays balance of skills 144 for the group of people 136 on radar chart 126. In this manner, operator 120 is able to visualize skills 134 for the group of people 136 and balance of skills 144 that may be desired in performing operation 150. Operation 150 may be performed by operator 120 or some other person. In this illustrative example, operation 150 may be performed with respect to people 136. In this illustrative example, operation 150 may be selected from one of hiring, filling a position, creating a team, selecting benefits, or some other suitable type of operation.

For example, operation 150 may be to identify someone for a new or current position in organization 106. The position may be, for example, an accounting or research position. In still another illustrative example, the position may be one that is within a team. The team may be a group of people 136 selected for performing a task such as a research project. As another illustrative example, the team may be a more permanent group of people 136, such as a new division or department in organization 106.

Figure 2:
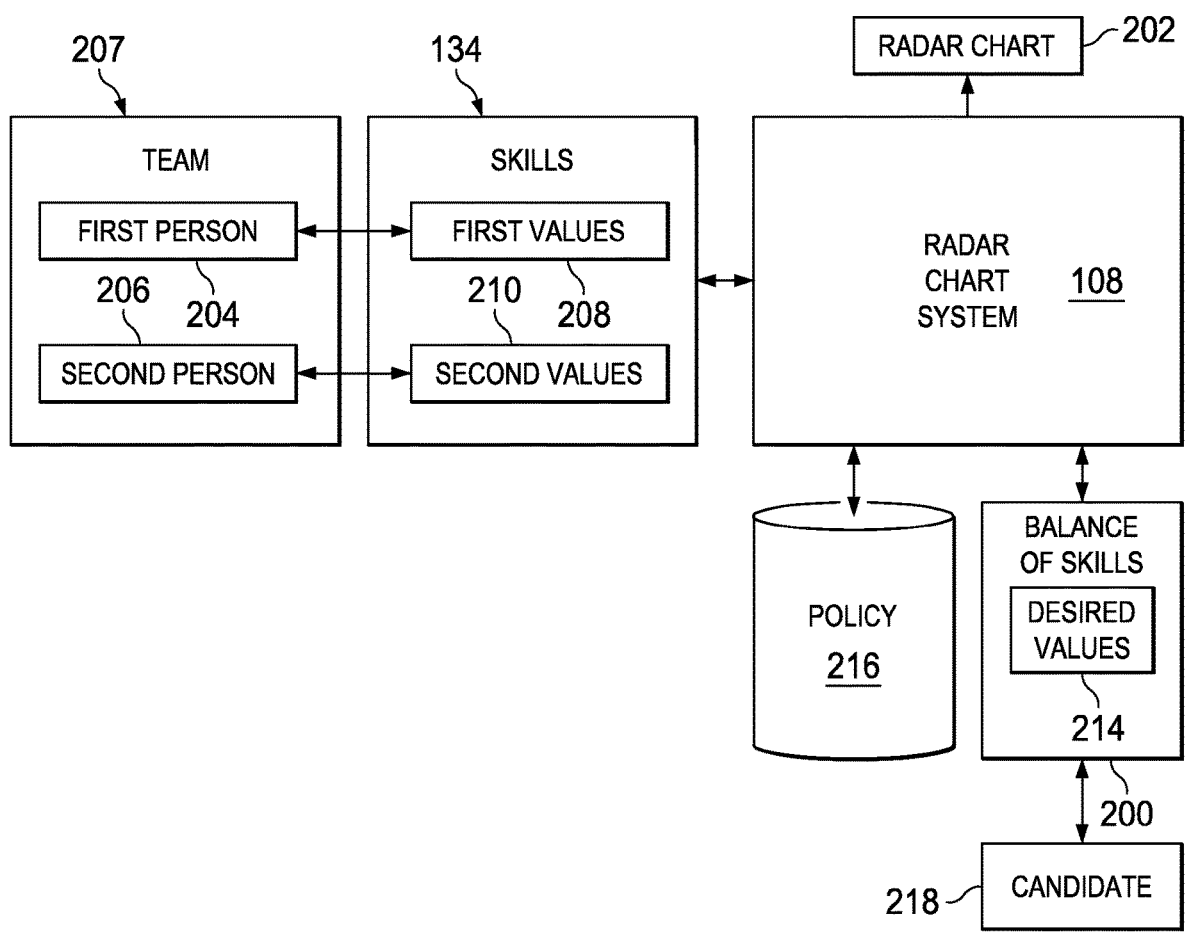
FIG. 2 is an illustration of a block diagram of identifying a balance of skills in accordance with an illustrative embodiment.

With reference next to FIG. 2, an illustration of a block diagram of identifying a balance of skills is depicted in accordance with an illustrative embodiment. As depicted, radar chart system 108 displays skills 134 for a group of people 136 in radar chart 202. Radar chart system 108 also displays balance of skills 200 in radar chart 202.

As depicted, a group of people 136 includes first person 204 and second person 206. First person 204 and second person 206 form team 207. Radar chart 202 is an example of a radar chart in radar charts 114 that may be displayed in graphical user interface 116 in display system 118 in FIG. 1.

As depicted, skills 134 for first person 204 have first values 208, and skills 134 for second person 206 have second values 210. Skills 134 for first person 204 and second person 206 are displayed by radar chart system 108 in radar chart 202 using first values 208 and second values 210, respectively. In this manner, a visualization of skills 134 for first person 204 and second person 206 may be visualized through radar chart 202.

In this example, radar chart system 108 identifies balance of skills 200 for skills 134 for first person 204 and second person 206 and displays balance of skills 200 in radar chart 126 in graphical user interface 116 in display system 118. For example, balance of skills 200 is identified based on first values 208 for skills 134 for first person 204 and second values 210 for skills 134 for second person 206. In particular, desired values 214 are identified for balance of skills 200 based on first values 208 and second values 210. In other words, desired values 214 for balance of skills 144 is identified based on the group of people 136 that are selected for display in radar chart 126.

In this illustrative example, radar chart system 108 identifies desired values 214 for balance of skills 200 using policy 216. Policy 216 is one or more rules that are used to identify desired values 214. Policy 216 also may include data used to apply the one or more rules.

In one illustrative example, a rule in policy 216 may state people 136 in team 207 should have skills with a particular average value within team 207. In other words, each skill is averaged based on the values for each person in team 207.

Radar chart system 108 identifies an average value for the skills for team 207. Radar chart system 108 compares these average values identified for skills 134 for team 207 to the values for those skills as set out in policy 216.

For example, that average value for a skill is compared to a value set out in policy 216 for that skill. If the average value is lower than the value set out in policy 216, radar chart system 108 identifies the desired value for that skill to be a value that causes the average value for that skill to reach the value set out in policy 216.

This process is performed for each of the skills of interest for the team to identify desired values 214 for balance of skills 200. Radar chart system 108 displays balance of skills 144 in radar chart 202 using desired values 214 as identified by radar chart system 108.

In this illustrative example, balance of skills 144 displayed in radar chart 202 represents skills desired for candidate 218 being considered for team 207. In the illustrative example, balance of skills 144 may be used to identify skills needed for a particular team or position. The position may be in a team.

In another illustrative example, policy 216 may state that a particular skill in skills 134 should have a particular value. This value is a desired value in desired values 214. The particular value may be selected based on, for example, the importance of the skill for a particular task, position, team, or other factor.

In yet another illustrative example, balance of skills 144 may have desired values 214 that are identified based on other considerations. For example, programming may be a skill in skills 134 that everyone in the team should have with a value that is equal to or greater than a particular value set out in policy 216.

In this example, averaging is not performed. Instead, desired values 214 are selected based on policy 216 as a particular value.

Additionally, the comparison may be made to identify which skills in skills 134 for candidate 218 may need improvement. For example, additional experience, classes, education, or other things may be offered to candidate 218 to help increase skills in a group of skills 134 that need improvement. The display of balance of skills 144 with group of skills 134 aids in visualizing which skills in group of skills 134 may need improvement for candidate 218.

Thus, balance of skills 200 may represent actual skills for a person. In other words, a search may be made for candidate 218 from people 136 with skills 134 that have values 135 that are desired values 214 for balance of skills 200. The person that is candidate 218 would ideally have balance of skills 200 or skills 134 with values within some threshold with respect to desired values 214 for balance of skills 200.

In this manner, balance of skills 200 for candidate 218 may be for an actual person or a fictional person. For example, balance of skills 200 may have desired values 214 that are used to search for candidate 218 in the form of a real person.

In this manner, radar chart system 108 in computer system 112 provides one or more technical solutions that overcome the technical problem of visualizing skills of candidates using charts. As a result, radar chart system 108 enables visualizing skills that may be needed by candidates being considered for a position as well as evaluating skill levels of people already in a position to identify improvements that may be needed to skills for those people.

As a result, computer system 112 operates as a special purpose computer system in which radar chart system 108 in computer system 112 enables accessing information 104 in computer system 112. Radar chart system 108 and graphical user interface 116 enable visualizing information 104 through radar charts 114.

As depicted in the illustrative example, this visualization also includes an analysis in the form of balance of skills 200 that more easily allows visualizing what skills may be needed in a particular candidate being considered for a position, what skills may need improvement in a current person in organization 106, or other suitable types of visualizations. Thus, radar chart system 108 transforms computer system 112 into a special purpose computer system as compared to currently available general computer systems that do not have radar chart system 108.

Computer system 112 performs a transformation of data such as information 104 from a format for storage in database 110 to a format for display on radar charts 114 in graphical user interface 116 in display system 118. This transformation changes information 104 from the first format to the second format such that information 104 has a different function or has a different use when displayed in the form of radar charts 114 in graphical user interface 116 in display system 118 as compared to the format when stored in database 110.

Additionally, radar chart system 108 uses information about skills 134 for people 136 to generate new information such as balance of skills 200 that may be displayed in radar charts 114 to provide additional visualizations of the level of skill that may be needed. In this manner, operation 150 may be performed more efficiently based on the ability to more easily comprehend information 104 through the use of radar charts 114 that include a display of balance of skills 200.

Figure 3:
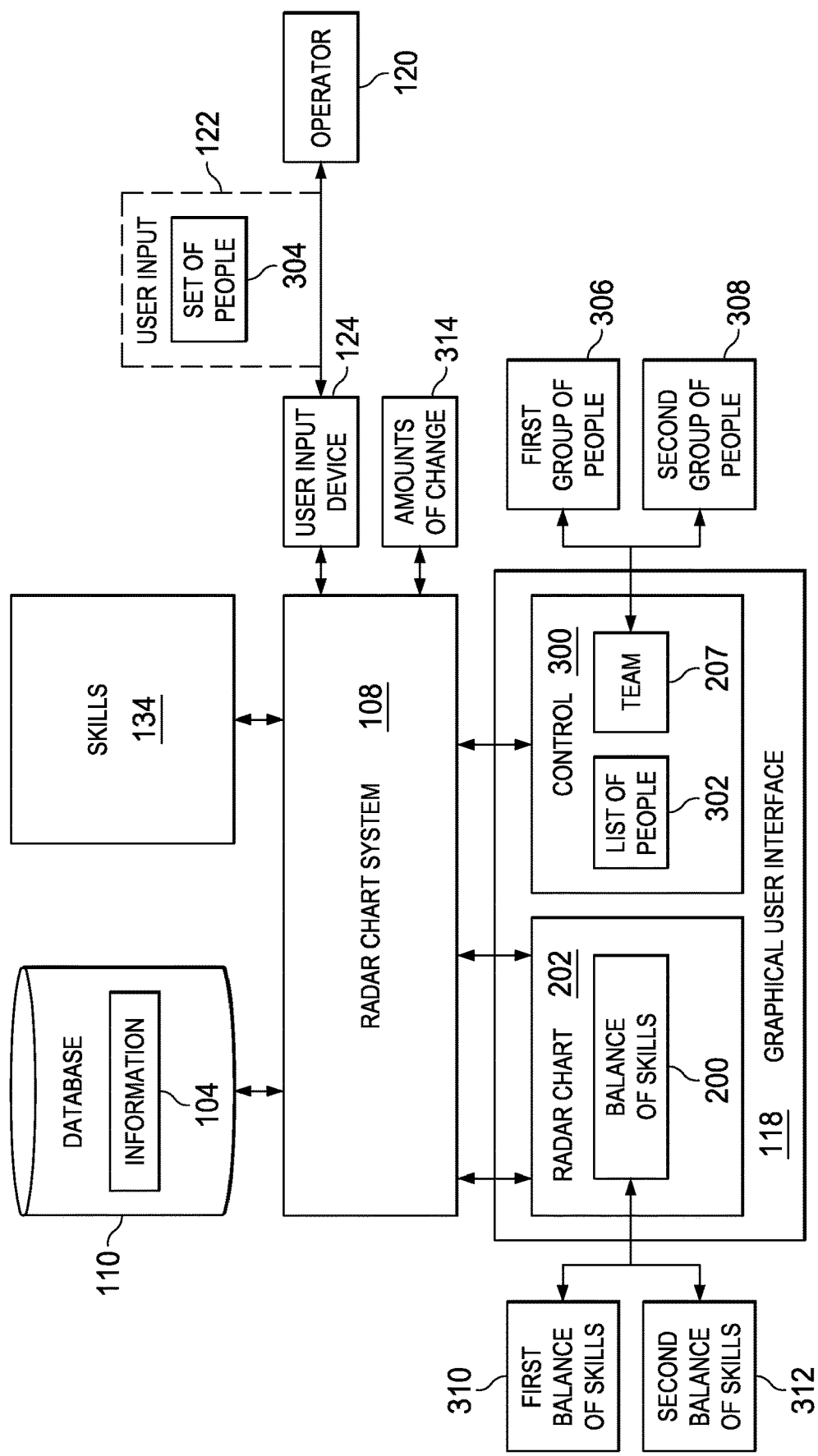
FIG. 3 is an illustration of a block diagram of data flow for selecting people in a group of people to meet a desired proportion of skills for the group of people in accordance with an illustrative embodiment.

With reference now to FIG. 3, an illustration of a block diagram of data flow for selecting people in a group of people to meet a desired proportion of skills for the group of people is depicted in accordance with an illustrative embodiment. In this figure, an example of processing user input 122 selecting people for team 207 to meet desired values 214 for balance of skills 200 for team 207 is shown.

In this illustrative example, graphical user interface 116 includes radar chart 202 and control 300. As depicted, radar chart system 108 provides access to team 207 through control 300.

Control 300 includes list of people 302 and team 207. List of people 302 is one or more of people 136 in organization 106 that are not currently on team 207. People 136 in list of people 302 may be added to team 207 through radar chart system 108 using control 300.

Radar chart system 108 identifies list of people 302 in organization 106. For example, radar chart system 108 may identify list of people 302 in organization 106 that are not on team 207 using information 104.

As depicted, operator 120 specifies which people are on team 207 by providing user input 122 to control 300 through user input device 124. In this illustrative example, user input 122 includes set of people 304. Radar chart system 108 processes set of people 304 received in user input 122 by at least one of adding set of people 304 to first group of people 306 or removing set of people 304 from first group of people 306 to form second group of people 308. For example, set of people 304 received in user input 122 may be part of a drag and drop operation that moves set of people 304 between list of people 302 and team 207.

As used herein, "a set of," when used with reference to items, means one or more items. For example, "set of people 304" is one or more of people 304.

In this illustrative example, team 207 is initially set to first group of people 306. Balance of skills 200 for team 207 is initially set to first balance of skills 310. Radar chart system 108 displays first balance of skills 310 in radar chart 202 in graphical user interface 116 for team 207 when team 207 includes first group of people 306.

Radar chart system 108 then adjusts team 207 by setting team 207 to second group of people 308 when set of people 304 is received in user input 122. Radar chart system 108 displays second balance of skills 312 in radar chart 202 in graphical user interface 116 for team 207 when team 207 includes second group of people 308.

As depicted, radar chart system 108 identifies amounts of change 314 in first balance of skills 310 for first group of people 306 for each person in list of people 302 added to first group of people 306. In other words, radar chart system 108 identifies for each person in list of people 302 what the amount of change would be to first balance of skills 310 if the person is added to first group of people 306.

In this illustrative example, radar chart system 108 sorts list of people 302 based on amounts of change 314. In sorting list of people 302, radar chart system 108 identifies which people in list of people 302 are the best people to add to team 207 to meet desired values 214 for balance of skills 200 for team 207.

Figure 4:
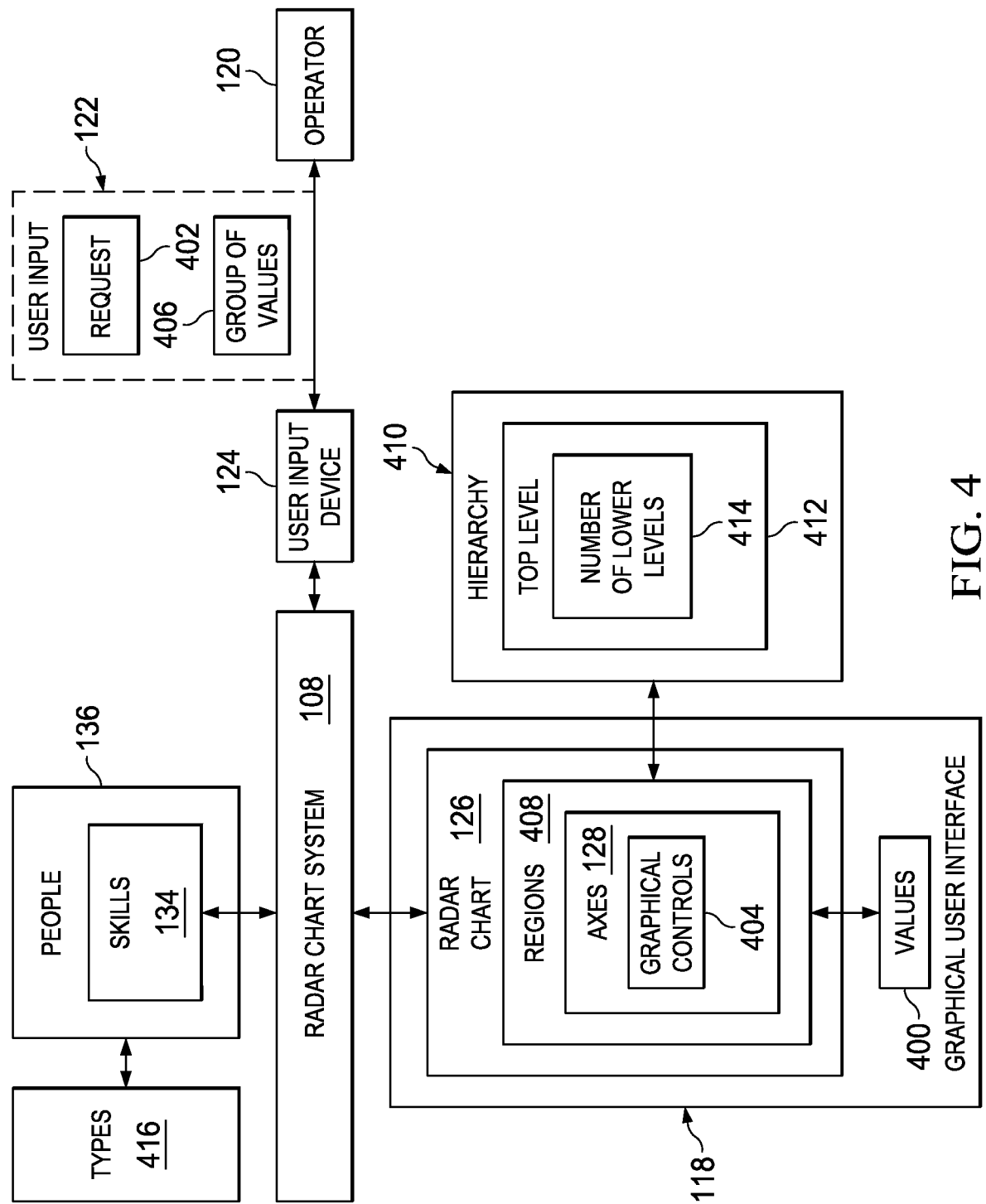
FIG. 4 is an illustration of a block diagram of data flow for changing values for skills for a group of people in accordance with an illustrative embodiment.

Turning to FIG. 4, an illustration of a block diagram of data flow for changing values for skills for a group of people is depicted in accordance with an illustrative embodiment. In this figure, an example of processing user input 122 for changing values 135 used to quantify skills 134 for the group of people 136 is shown.

In this illustrative example, radar chart system 108 displays values 400 for skills 134 for the group of people 136. Values 400 are examples of values 135 in FIG. 1. As depicted, values 400 for the group of people 136 are displayed on axes 128 in radar chart 126.

In this illustrative example, radar chart system 108 receives request 402 in user input 122 to change values 400 for skills 134 for the group of people 136. For example, the change may be to values 400 for one person in group of people 136 or several people in group of people 136. The skills changed may be for one skill in skills 134 or multiple skills in skills 134.

Radar chart system 108 displays graphical controls 404 on axes 128 of radar chart 126 for changing values 400 for skills 134 for the group of people 136. Graphical controls 404 are objects displayed in graphical user interface 116 that can be manipulated by user input 122 to make changes in values 400 for skills 134. Each graphical control in graphical controls 404 is for a skill in skills 134 for a person in the group of people 136. Each graphical control is displayed on an axis in axes 128 in a location along the axis corresponding to the value for the skill for the person.

In this illustrative example, graphical controls 404 may be selected from at least one of round buttons, arrow buttons, entry fields, or other suitable types of controls for changing the value for the skill for the person based on user input 122. For example, when graphical controls 404 are arrows, user input 122 to the arrows changes the value for the skill for the person. In this example, the direction of the arrow selected identifies a new location for the value along the axis.

As another example, when graphical controls 404 are round buttons, user input 122 to the round buttons may be a drag and drop operation that selects a new location for the value for the skill for the person. As still another example, when graphical controls 404 are entry fields, user input 122 to entry fields may be keyboard input entering the value for the skill for the person.

As depicted, radar chart system 108 receives group of values 406 in user input 122 to graphical controls 404 for changing values 400. Radar chart system 108 changes values 400 for skills 134 based on group of values 406 received in user input 122. For example, group of values 406 may include changes to values 400 for one person in group of people 136 or several people in group of people 136. As another example, group of values 406 may include changes to values 400 for one skill in skills 134 or multiple skills in skills 134.

Radar chart system 108 displays axes 128 in regions 408 of radar chart 126. Regions 408 of radar chart 126 are portions of radar chart 126 that include one or more axes in axes 128 of radar chart 126. As depicted, regions 408 of radar chart 126 represent skills located in hierarchy 410 of skills 134.

In this illustrative example, hierarchy 410 of skills 134 includes top level 412 with number of lower levels 414. Top level 412 includes skills 134 that are of a higher level in hierarchy 410 than the skills in number of lower levels 414. Skills 134 in top level 412 are types of skills for one or more of skills 134 in number of lower levels 414. A type of skill is a category for skills 134 in which skills 134 have characteristics that are common to each other. For example, when top level 412 includes programming skill, programming skill is a type of skill for skills 134 in number of lower levels 414 that have characteristics common to programming.

As depicted, types 416 are a portion of skills 134. Radar chart system 108 identifies types 416 based on hierarchy 410. For example, radar chart system 108 may identify a number of types 416 from skills 134 located in top level 412 of hierarchy 410.

In this example, a region in regions 408 may be used to show skills 134 in number of lower levels 414 that have characteristics common to a type of skill in types 416. For example, when the type of skill for the region is programming, the skills in number of lower levels 414 for the region may be selected from at least one of cascading style sheet (CSS) programming, hypertext markup language (HTML) programming, javascript development, data driven document (D3) programming, or node based programming.

The illustration of information environment 100 and the different components in information environment 100 in FIGS. 1-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, radar chart system 108 may be used to select people 136 for team 207 for radar chart 202 and display balance of skills 200 on radar chart 202 all at once. In this example, balance of skills 200 is updated in radar chart 202 each time at least one of values 135 for skills 134 for people 136 on team 207 are changed or the people selected on team 207 are changed.

Figure 5:
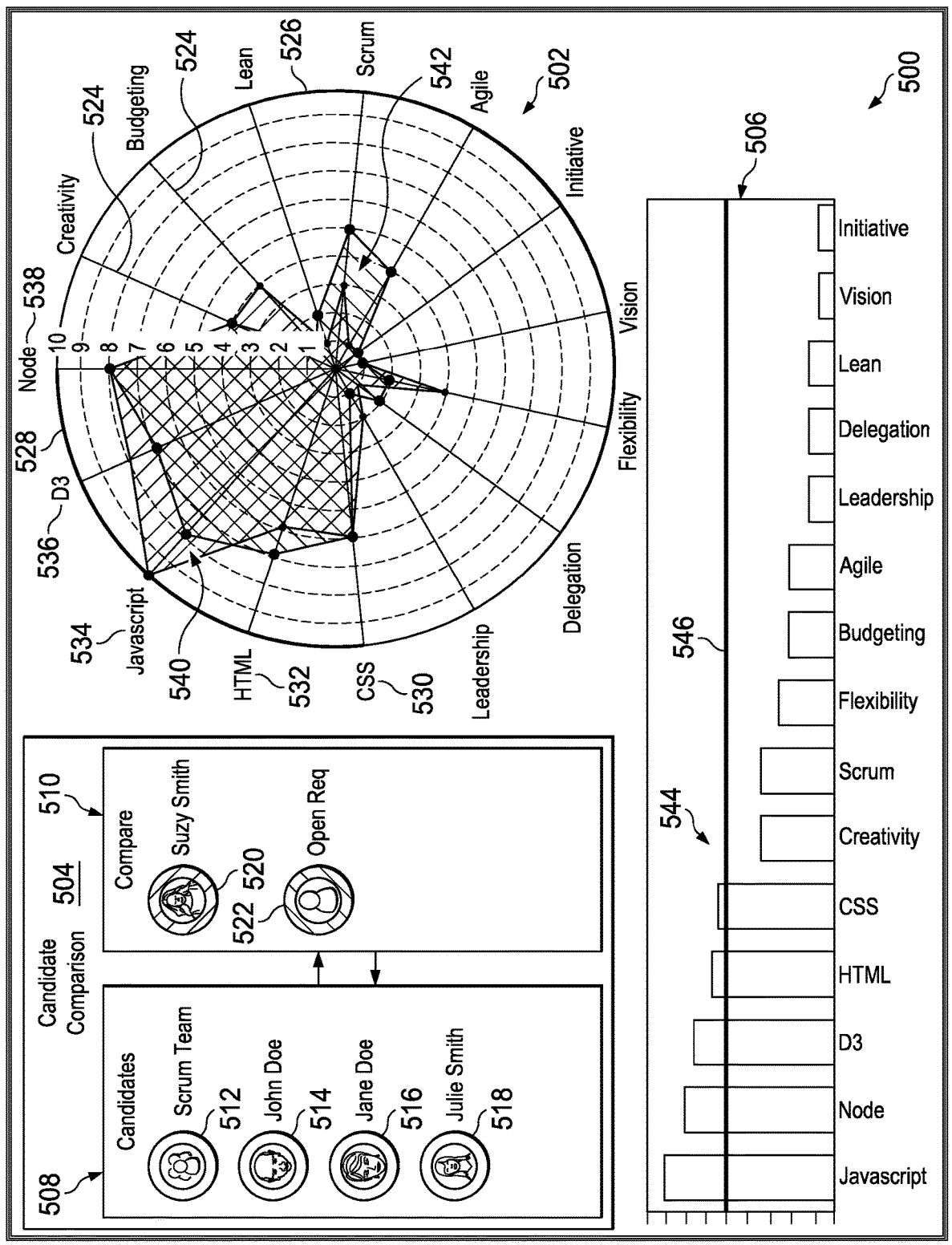
FIG. 5 is an illustration of a radar chart in a graphical user interface for analyzing skills in accordance with an illustrative embodiment.
Figure 6:
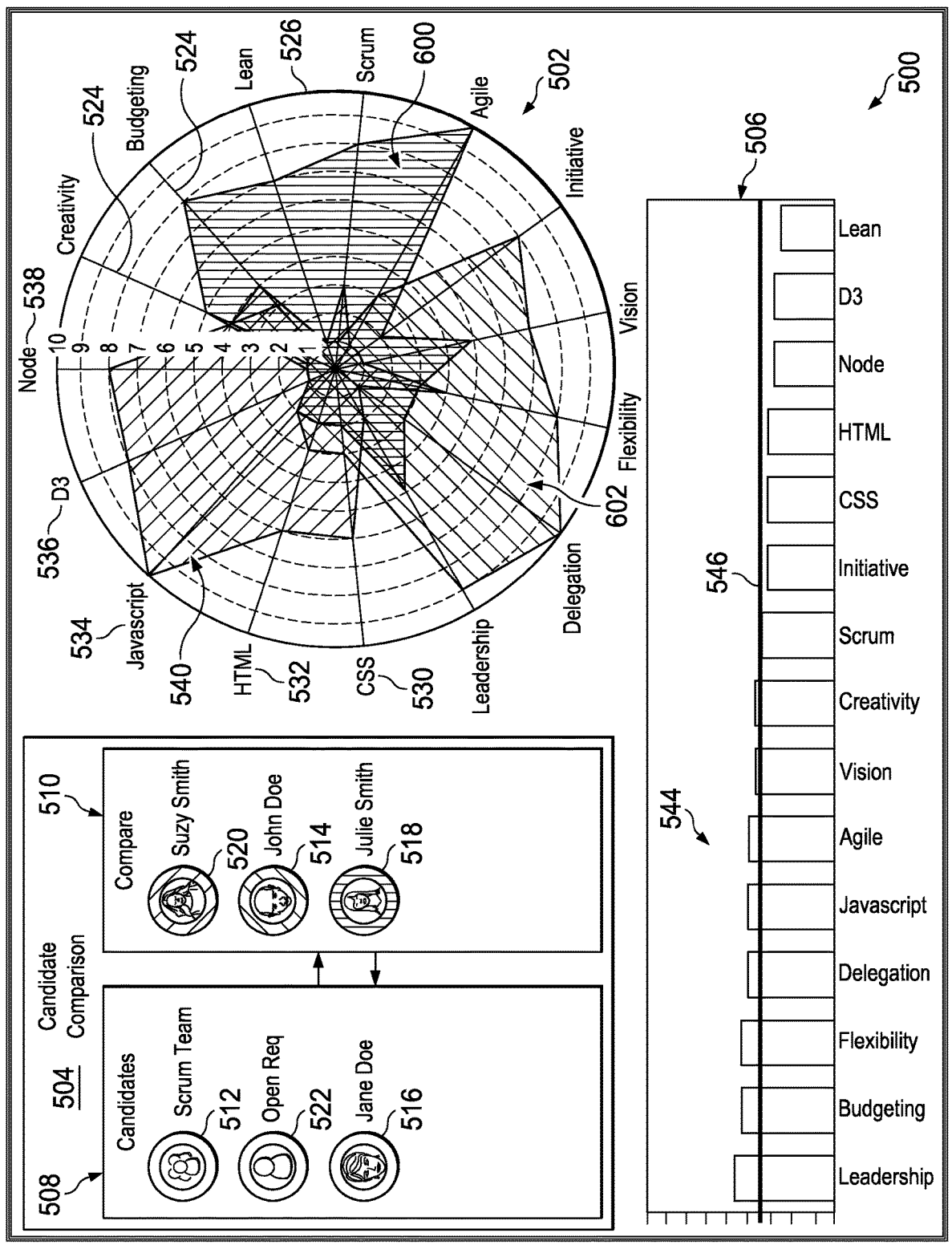
FIG. 6 is an illustration of a radar chart in a graphical user interface for analyzing skills in a graphical user interface in accordance with an illustrative embodiment.
Figure 7:
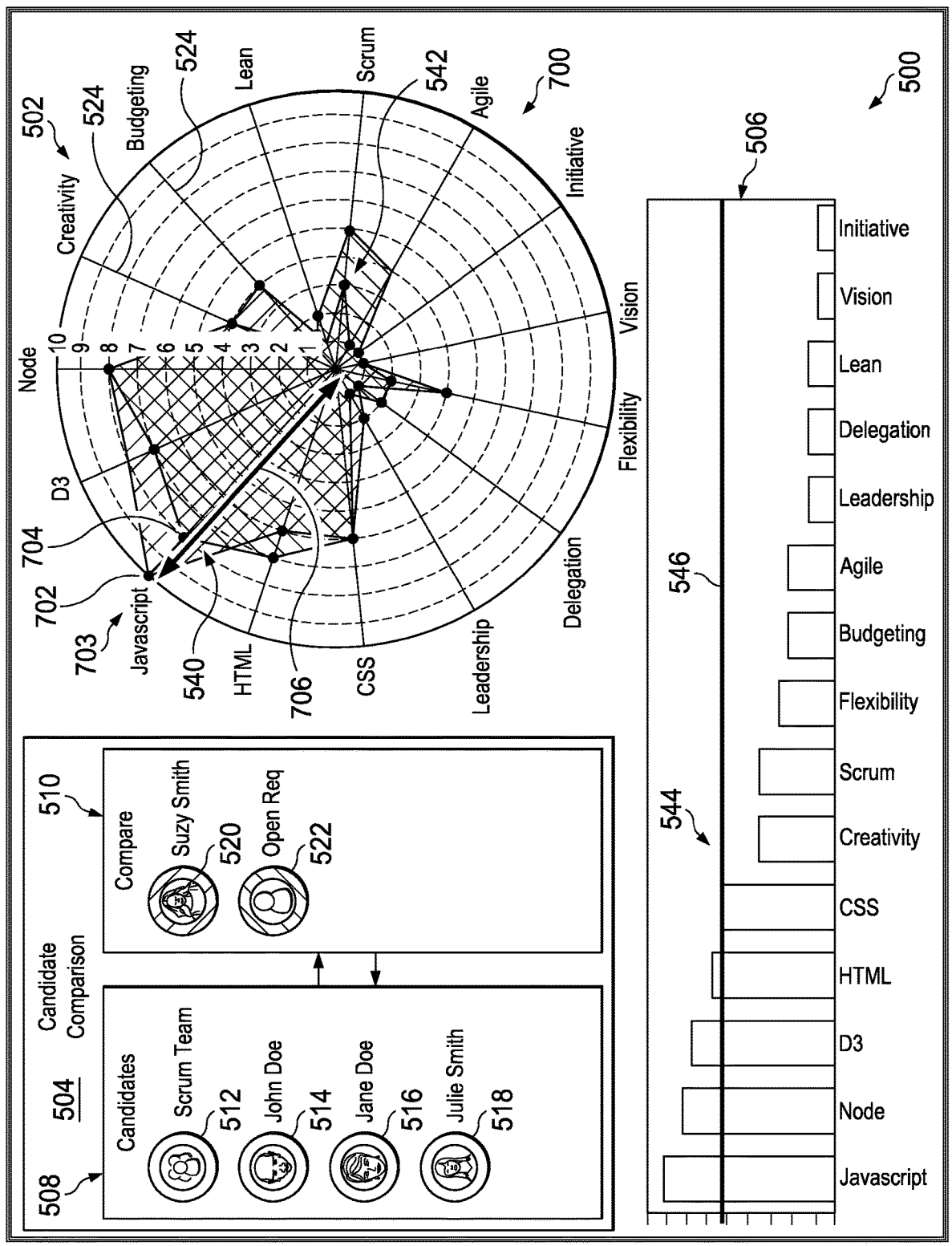
FIG. 7 is an illustration of changing values for skills for a group of people in a graphical user interface in accordance with an illustrative embodiment.

FIGS. 5-7 are illustrative examples of a graphical user interface that may be used to analyze skills for a group of people. With reference first to FIG. 5, an illustration of a radar chart in a graphical user interface for analyzing skills is depicted in accordance with an illustrative embodiment. As depicted, graphical user interface 500 is an example of one implementation for graphical user interface 116 shown in block form in FIG. 1.

In this illustrative example, graphical user interface 500 includes a number of different graphical elements. As depicted, graphical user interface 500 includes radar chart 502, control 504, and bar chart 506. Radar chart 502 is an example of radar chart 126 shown in block form in FIG. 1. Control 504 is an example of control 300 shown in block form in FIG. 3.

As depicted, control 504 includes list of people 508 and team 510. List of people 508 is an example of list of people 302 shown in block form in FIG. 3. Team 510 is an example of team 207 shown in block form in FIGS. 2-3.

In the illustrative example, list of people 508 includes sub group 512, person 514, person 516, and person 518. As depicted, team 510 includes person 520 and candidate 522. Person 520 is an example of first person 204 shown in block form in FIG. 2. Candidate 522 is an example of candidate 218 shown in block form in FIG. 2.

Radar chart 502 includes axes 524 for skills 134. Axes 524 are an example of axes 128 in block form in FIG. 1 and FIG. 4. As depicted, axes 524 are arranged on radar chart 502 based on hierarchy 526 of skills 134. Hierarchy 526 is an example of hierarchy 410 shown in block form in FIG. 4. Region 528 is an example of a region in regions 408 representing a skill in top level 412 of skills 134 shown in block form in FIG. 4.

As depicted, skill 530, skill 532, skill 534, skill 536, and skill 538 are skills 134 in region 528. These skills are examples of skills in number of lower levels 414 shown in block form in FIG. 4. In this illustrative example, values 540 for skills 134 on axes 524 are for person 520. Values 542 for skills 134 on axes 524 are for candidate 522. Values 540 and values 542 are examples of values 135 shown in block form in FIG. 1.

In this illustrative example, the people selected on team 510 are the people shown for comparison on radar chart 502. As depicted, the people on team 510 are selected via control 504. In this illustrative example, people in list of people 508 can be moved from list of people 508 to team 510. Likewise, people in team 510 can be moved from team 510 to list of people 508. For example, a set of people in control 504 may be part of a drag and drop operation that moves the set of people between list of people 302 and team 207.

In this illustrative example, bar chart 506 includes bars 544 and average value 546 for skills 134. In this illustrative example, policy 216 is for having average value 546 for skills 134 for team 510. Average value 546 is an example of the average value determined by policy 216 in FIG. 2.

As depicted, average value 546 for skills 134 for policy 216 is computed as the maximum value for skill divided by the number of people on team 510. In this illustrative example, the maximum value for skill is 10, the number of people on team 510 is 2, and average value 546 is 5.

As depicted, the height of bars 544 in bar chart 506 represents the average of values 540 and values 542 for skills 134. In this illustrative example, the height of bars 544 indicates that team 510 does not meet policy 216. Team 510 does not meet policy 216 because the average values for skills 134 for team 510 are not close to average value 546 for skills 134.

In the illustrative example, the people shown in radar chart 502 are updated as people are moved between list of people 508 and team 510. The height of bars 544 and average value 546 are also updated as people are moved between list of people 508 and team 510. Thus, graphical user interface 500 may be used to analyze different combinations of adding or removing people from team 510 to meet policy 216.

With reference next to FIG. 6, an illustration of a radar chart in a graphical user interface for analyzing skills in a graphical user interface is depicted in accordance with an illustrative embodiment. In this illustrative example, the people in team 510 have been changed to meet policy 216.

As depicted, candidate 522 has been moved from team 510 to list of people 508; person 514 and person 518 have been moved from list of people 508 to team 510. In this illustrative example, values 600 for skills 134 on axes 524 are for person 518. Values 602 for skills 134 on axes 524 are for candidate 522. Values 600 and values 602 are examples of values 135 shown in block form in FIG. 1.

In this illustrative example, the maximum value for skill is 10, the number of people on team 510 is 3, and average value 546 is 3.3. As depicted, team 510 meets policy 216 because the average values for skills 134 for team 510 are close to average value 546 for skills 134.

As depicted, each person in team 510 is an example of balance of skills 144 for the other people in team 510. In other words, if person 518 is removed from team 510, person 518 would have skills 144 that meet desired values 214 for balance of skills 200 using policy 216.

With reference now to FIG. 7, an illustration of changing values for skills for a group of people in a graphical user interface is depicted in accordance with an illustrative embodiment. In this illustration, radar chart system 108 has received request 402 in user input 122 to change values for skills 134 for the group of people 136.

Radar chart system 108 has displayed graphical controls 700 on axes 524 of radar chart 502 for changing values 540 and values 542 for skills 134 for team 510. As depicted, graphical controls 700 include graphical control 702 and graphical control 704. Graphical control 702 is for a value in values 540 for skill 703 and graphical control 704 is for a value in values 542 for skill 703. Skill 703 is an example of a skill in skills 134.

In this illustrative example, the value in values 540 controlled by graphical control 702 is changed by moving graphical control 702 in the direction of arrow 706. Similarly, the value in values 542 controlled by graphical control 704 is changed by moving graphical control 704 in the direction of arrow 706.

Figure 8:
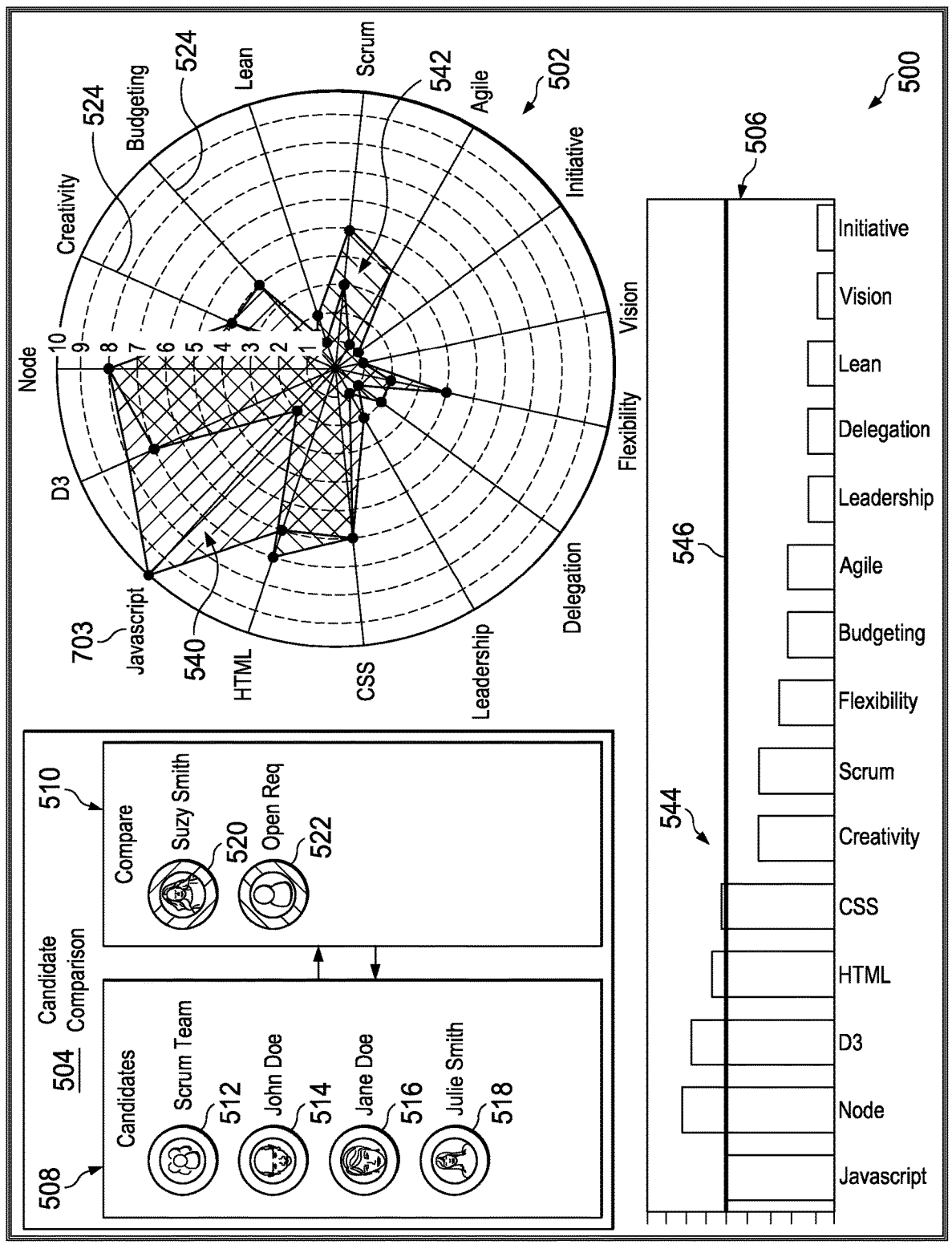
FIG. 8 is an illustration of changing values for skills for a group of people on a radar chart in a graphical user interface in accordance with an illustrative embodiment.

Turning to FIG. 8, an illustration of changing values for skills for a group of people on a radar chart in a graphical user interface is depicted in accordance with an illustrative embodiment. In this illustrative example, the value in values 542 for skill 703 has been changed.

As depicted, the height of a bar in bars 544 for skill 703 has been updated to show the change in the average for skill 703 for team 510. Thus, graphical user interface 500 may be used to analyze different combinations of values for skills of people in team 510 for suggesting changes to skills for people in team 510.

The illustrations of the graphical user interfaces in FIGS. 5-8 are only presented as examples and are not meant to limit the manner in which graphical user interface 116 shown in block form in FIG. 1 may be implemented. For example, graphical controls 700 in FIG. 7 could be any shape, not just circles. As another example, bar chart 506 could be selected from a three-dimensional bar chart, a line chart, or any other suitable type of chart.

Figure 9:
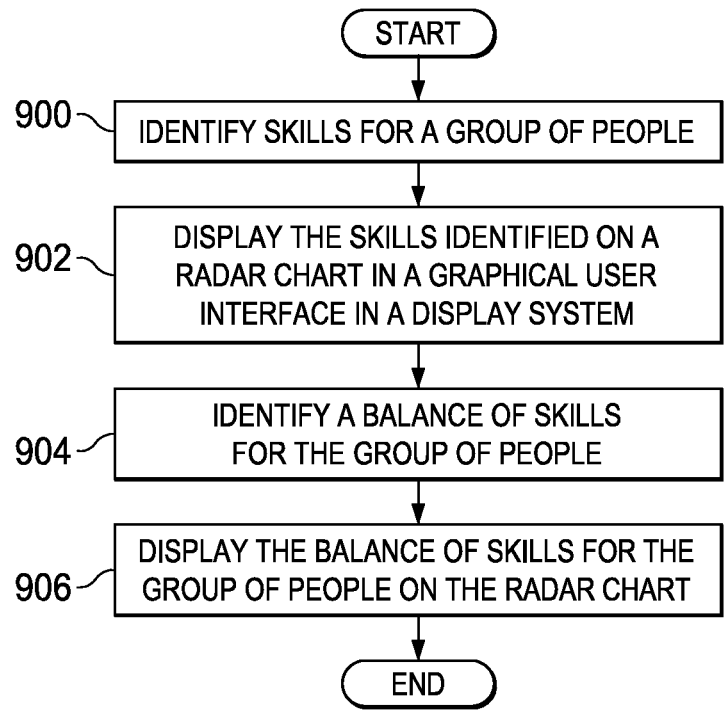
FIG. 9 is an illustration of a flowchart of a process for analyzing skills in accordance with an illustrative embodiment.

Turning next to FIG. 9, an illustration of a flowchart of a process for analyzing skills is depicted in accordance with an illustrative embodiment. The process illustrated in FIG. 9 may be implemented in information environment 100 in FIG. 1. For example, the process may be implemented as operations performed by radar chart system 108 in FIG. 1.

The process begins by identifying skills for a group of people (operation 900). Next, the process displays the skills identified on a radar chart in a graphical user interface in a display system (operation 902). The radar chart has axes extending from a common origin in which a skill in skills for a person in the group of people is displayed on an axis in the axes corresponding to the skill.

The process identifies a balance of skills for the group of people (operation 904). The balance of skills has desired values for skills needed for the group of people. The balance of skills for the group of people is displayed on the radar chart (operation 906) with the process terminating thereafter.

The process illustrated in this example enables analyzing the skills through the balance of skills displayed in the radar chart. With this analysis, real-world operations may be performed for organization 106. These real-world operations may include hiring a person, forming a team, identifying continuing education classes for people, and other operations for organization 106.

Figure 10:
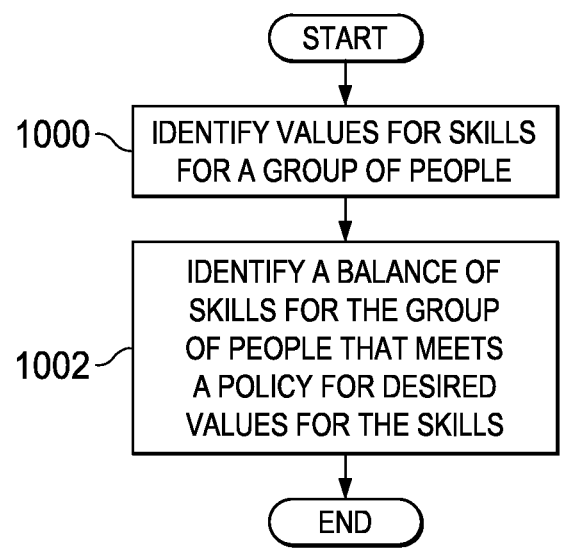
FIG. 10 is an illustration of a flowchart of a process for identifying a balance of skills in accordance with an illustrative embodiment.

Turning now to FIG. 10, an illustration of a flowchart of a process for identifying a balance of skills is depicted in accordance with an illustrative embodiment. The process in this illustration is one example of an implementation for operation 904 in FIG. 9. The process illustrated in FIG. 10 may be implemented in information environment 100 in FIG. 1. For example, the process may be implemented as operations performed by radar chart system 108 in FIG. 1.

The process begins by identifying values for skills for a group of people (operation 1000). Next, the process identifies a balance of skills for the group of people that meets a policy for desired values for the skills (operation 1002) with the process terminating thereafter. For example, if the policy in operation 1002 is that the group of people has the desired value of 5 for the skills, the balance of skills is values for the skills that meet the desired value of 5 when the balance of skills is added to the group of people.

As another example, the policy in operation 1002 may be that the group of people has average values for the skills that do not go outside a range of values. A range of values is the values between two values. For example, when the highest value of skill is 10, the range of values for the policy may be for maintaining an average of between 3 and 10 for the average values for the skills.

As still another example, the policy in operation 1002 may be that the group of people has average values for the skills that meet a list of values selected for the skills. For example, an operator may have selected the list of values for the average values for the policy.

Figure 11:
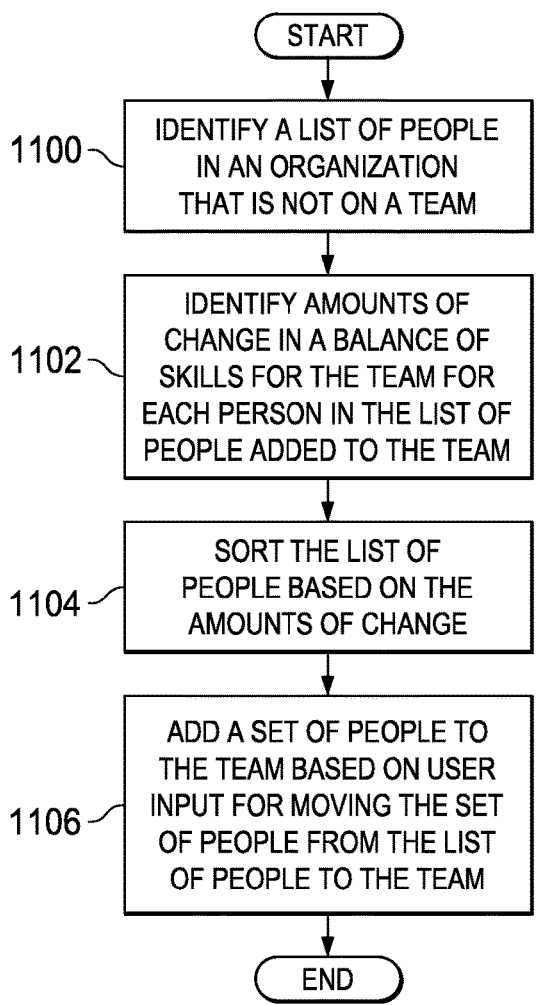
FIG. 11 is an illustration of a flowchart of a process for selecting people in a group of people to meet a desired proportion of skills for the group of people in accordance with an illustrative embodiment.

With reference next to FIG. 11, an illustration of a flowchart of a process for selecting people in a group of people to meet a desired proportion of skills for the group of people is depicted in accordance with an illustrative embodiment. The process illustrated in FIG. 11 may be implemented in information environment 100 in FIG. 1. For example, the process may be implemented as operations performed by radar chart system 108 in FIG. 1.

The process begins by identifying a list of people in an organization that is not on a team (operation 1100). Next, the process identifies amounts of change in a balance of skills for the team for each person in the list of people added to the team (operation 1102).

The process sorts the list of people based on the amounts of change (operation 1104). The process then adds a set of people to the team based on user input for moving the set of people from the list of people to the team (operation 1106) with the process terminating thereafter.

Figure 12:
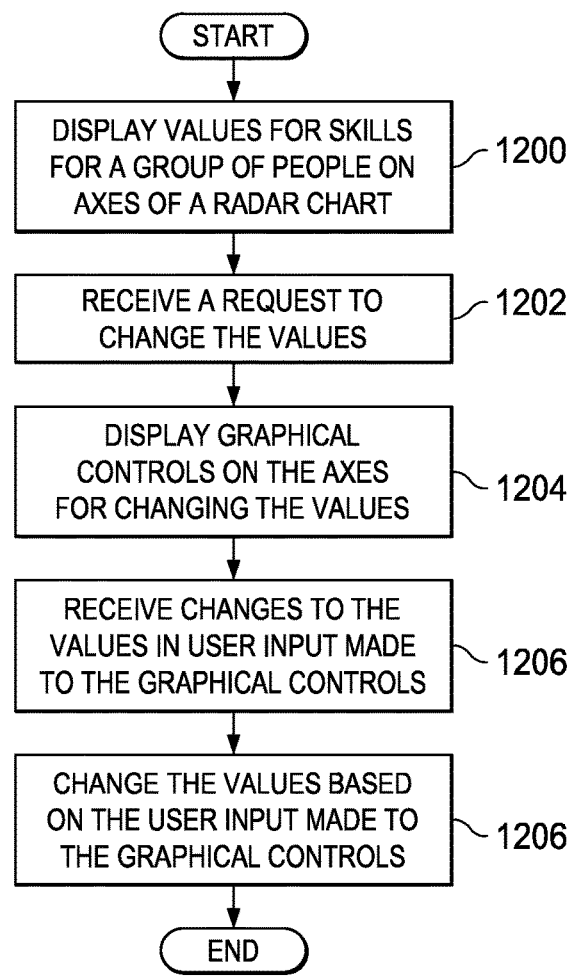
FIG. 12 is an illustration of a flowchart of a process for changing values for skills for a group of people in accordance with an illustrative embodiment.

With reference next to FIG. 12, an illustration of a flowchart of a process for changing values for skills for a group of people is depicted in accordance with an illustrative embodiment. The process illustrated in FIG. 12 may be implemented in information environment 100 in FIG. 1. For example, the process may be implemented as operations performed by radar chart system 108 in FIG. 1.

The process begins by displaying values for skills for a group of people on axes of a radar chart (operation 1200). Next, the process receives a request to change the values (operation 1202).

The process displays graphical controls on the axes for changing the values (operation 1204). The process receives changes to the values in user input made to the graphical controls (operation 1206). The process then changes the values based on the user input made to the graphical controls (operation 1208) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
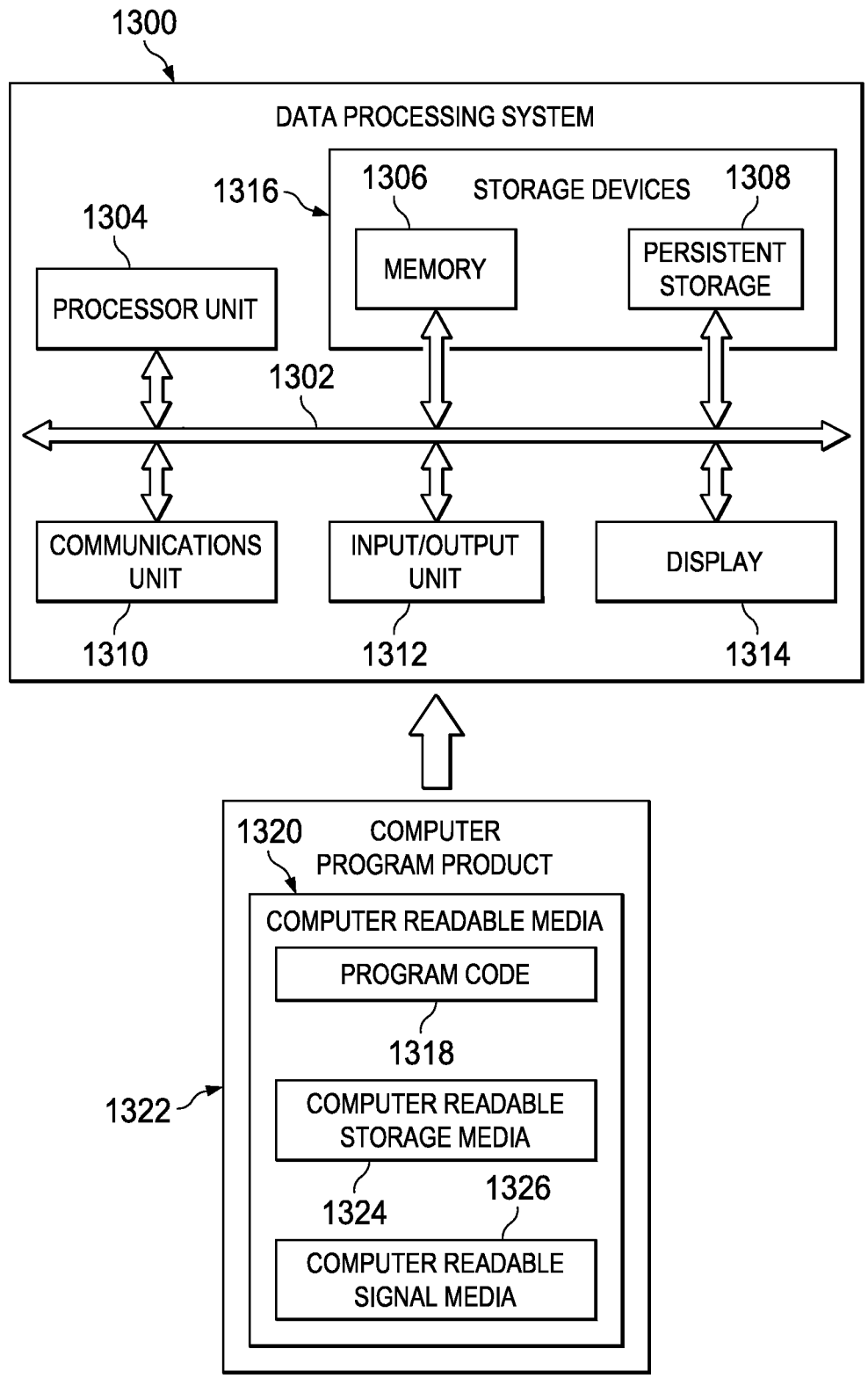
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 may be used to implement one or more computers and computer system 112 in FIG. 1. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318. Alternatively, program code 1318 may be transferred to data processing system 1300 using computer readable signal media 1326.

Computer readable signal media 1326 may be, for example, a propagated data signal containing program code 1318. For example, computer readable signal media 1326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

Thus, the illustrative embodiments provide a method and apparatus for analyzing skills. For example, radar chart system 108 in FIG. 1 provides a visualization of skills for people in an organization. This visualization is displayed in the form of a radar chart, a graphical user interface and a display system. The radar chart shows skills for people in the organization. In this manner, the skills are displayed in a manner that an operator viewing the radar chart is able to visualize the in skills for the people.

Further, radar chart system 108 provides an analysis in which the balance of skills is identified for the skills displayed for people in the radar chart. This balance of skills provides a visualization of strengths and weaknesses in skills for people displayed in the radar chart. Additionally, this balance skills may be used to identify a person with skills needed to fill a position, identify skills that may need improvement, and other suitable operations.

Thus, the illustrative examples provide one or more technical solutions for a method and apparatus that overcome the technical problem of visualizing skills of candidates using charts. The balance of skills displayed in the radar chart provides additional information not currently available to an operator. Thus, one or more illustrative examples enable analyzing skills through the balance of skills displayed in the radar chart.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for analyzing and displaying skills, the method comprising:
   identifying, by a computer system, the skills for a group of people;
   quantifying, by the computer system, a skill level for each identified skill for each person in the group;
   displaying, by the computer system, the identified skills on a radar chart in a graphical user interface in a display system, wherein the radar chart comprises multiple axes extending from a common origin, wherein each axis denotes a skill in the skills, and wherein a value of the skill level for each skill for a person in the group of people is displayed as a point along each respective axis, wherein the points along the axes are connected to form a respective geometric shape on the radar chart specific to the person;
   identifying, by the computer system, a balance of skills for the group of people according to an average skill level of each skill for all people in the group, wherein the balance of skills has desired values for the skills needed for the group of people;
   displaying, by the computer system, the balance of skills for the group of people in the radar chart by concurrently displaying the respective geometric shapes for all persons in the group to visualize the balance of skills; and
   in response to a user request to change skill values for a person on the radar chart, displaying, by the computer system, graphical controls on the axes of the radar chart, wherein the graphical controls allow user input to move points along respective axes to change skill level values and respective geometric shape for that person on the radar chart.

2. The method of claim 1, wherein the balance of skills is the skills having the desired values for selecting a new person to add to the group of people.

3. The method of claim 1, wherein the group of people comprises a number of the people and a subgroup of the people.

4. The method of claim 1 further comprising:
   identifying a hierarchy of the skills, wherein the hierarchy includes a top level with a number of lower levels for the skills; and
   wherein displaying the skills identified in the radar chart comprises:
      displaying the hierarchy of the skills in the radar chart, wherein the skills are placed in regions of the radar chart that correspond to at least one of the top level of the hierarchy or the number of lower levels in the top level of the hierarchy.

5. The method of claim 1 further comprising:
   identifying types for the skills; and
   wherein displaying the skills identified in the radar chart comprises:
      displaying the skills identified in the radar chart in regions based on the types identified for the skills, wherein each region corresponds to a type in the types.

6. The method of claim 1, wherein the group of people is a first group of people, the balance of skills is a first balance of skills, the radar chart is a first radar chart, and further comprising:
   identifying the skills for a second group of people;
   displaying the skills identified for the second group of people on a second radar chart in the graphical user interface, wherein the first radar chart and the second radar chart are displayed in the graphical user interface concurrently;
   identifying a second balance of skills for the second group of people, wherein the second balance of skills has the desired values for the skills needed for the second group of people; and
   displaying the second balance of skills for the second group of people in the second radar chart.

7. The method of claim 1, wherein the group of people is a first group of people and further comprising:
   displaying a control on the graphical user interface for at least one of adding a set of people to the first group of people or removing the set of people from the first group of people to form a second group of people, wherein the control includes a list of people of an organization that is not in the first group of people;
   identifying amounts of change in the balance of skills for the first group of people for each person in the list of people added to the first group of people; and
   sorting the list of people in the control based on the amounts of change in the balance of the skills.

8. The method of claim 7, wherein the balance of skills is a first balance of skills and further comprising:
   creating the second group of people based on user input to the control moving the set of people from the list of people to the first group of people; and
   displaying a second balance of skills for the second group of people in the radar chart.

9. The method of claim 1, further comprising:
   identifying, by the computer system, a candidate with skills with desired values; and
   adding, by the computer system, the candidate to the group of people.

10. A computer system comprising:
a bus system;
a display system connected to the bus system;
a storage device connected to the bus system, wherein the storage device stores program instructions;
a number of processors connected to the bus system, wherein the number of processors execute the program instructions to render a radar chart system in the display system, wherein the radar chart system is configured to:
identify skills for a group of people;
quantify a skill level for each identified skill for each person in the group;
display the identified skills on a radar chart in a graphical user interface in the display system, wherein the radar chart has axes extending from a common origin, wherein each axis denotes a skill in the skills, and wherein a value of the skill level for each skill for a person in the group of people is displayed as a point along each respective axis, wherein the points along the axes are connected to form a respective geometric shape on the radar chart specific to the person;
identify a balance of skills for the group of people according to an average skill level of each skill for all people in the group, wherein the balance of skills has desired values for the skills needed for the group of people;
display the balance of skills for the group of people in the radar chart by concurrently displaying the respective geometric shapes for all persons in the group to visualize the balance of skills; and
display graphical controls on the axes of the radar chart in response to a user request to change skill values for a person on the radar chart, wherein the graphical controls are configured to allow a user to move points along respective axes to change skill level values and respective geometric shape for that person on the radar chart.

11. The computer system of claim 10, wherein the balance of skills is the skills having the desired values for selecting a new person to add to the group of people.

12. The computer system of claim 10, wherein the group of people comprises a number of the people and a subgroup of the people.

13. The computer system of claim 10, wherein the radar chart system identifies an hierarchy of the skills, wherein the hierarchy includes a top level with a number of lower levels for the skills, and wherein in displaying the skills identified in the radar chart, the radar chart system displays the hierarchy of the skills in the radar chart in which the skills are placed in regions of the radar chart that correspond to at least one of the top level of the hierarchy or the number of lower levels in the top level of the hierarchy.

14. The computer system of claim 10, wherein the radar chart system identifies types for the skills, and wherein in displaying the skills identified in the radar chart, the radar chart system displays the skills identified in the radar chart in regions based on the types identified for the skills, wherein each region corresponds to a type in the types.

15. The computer system of claim 10, wherein the group of people is a first group of people, the balance of skills is a first balance of skills, the radar chart is a first radar chart, and the radar chart system identifies the skills for a second group of people; displays the skills identified for the second group of people on a second radar chart in the graphical user interface, wherein the first radar chart and the second radar chart are displayed in the graphical user interface concurrently; identifies a second balance of skills for the second group of people, wherein the second balance of skills has the desired values for the skills needed for the second group of people; and displays the second balance of skills for the second group of people in the second radar chart.

16. The computer system of claim 10, wherein the group of people is a first group of people, and wherein the radar chart system displays a control on the graphical user interface for at least one of adding a set of people to the first group of people or removing the set of people from the first group of people to form a second group of people, wherein the control includes a list of people of an organization that is not in the first group of people; identifies amounts of change in the balance of skills for the first group of people for each person in the list of people added to the first group of people; and sorts the list of people in the control based on the amounts of change in the balance of skills.

17. The computer system of claim 16, wherein the balance of skills is a first balance of skills, and wherein the radar chart system creates the second group of people based on user input to the control moving the set of people from the list of people to the first group of people and displays a second balance of skills for the second group of people in the radar chart.

18. The computer system of claim 10, wherein the radar chart system is further configured to:
identify a candidate that has skills that have values that are desired values; and
add the candidate to the group of people.

19. A computer program product for analyzing and displaying skills, the computer program product comprising:
a non-transitory computer readable storage device having a set of program instructions embodied therewith, the set of program instructions executable by a number of processors to perform the steps of:
identifying the skills for a group of people;
quantifying a skill level for each identified skill for each person in the group;
displaying the identified skills on a radar chart in a graphical user interface in a display system, wherein the radar chart has axes extending from a common origin, wherein each axis denotes a skill in the skills, and wherein a value of the skill level for each skill for a person in the group of people is displayed as a point along each respective axis, wherein the points along the axes are connected to form a respective geometric shape on the radar chart specific to the person;
identifying a balance of skills for the group of people according to an average skill level of each skill for all people in the group, wherein the balance of skills has desired values for the skills needed for the group of people;
displaying the balance of skills for the group of people in the radar chart by concurrently displaying the respective geometric shapes for all persons in the group to visualize the balance of skills; and
displaying graphical controls on the axes of the radar chart in response to a user request to change skill values for a person on the radar chart, wherein the graphical controls allow user input to move points along respective axes to change skill level values and respective geometric shape for that person on the radar chart.

20. The computer program product of claim 19 further comprising instructions for:
identifying a hierarchy of the skills, wherein the hierarchy includes a top level with a number of lower levels for the skills; and displaying the hierarchy of the skills in the radar chart, wherein the skills are placed in regions of the radar chart that correspond to at least one of the top level of the hierarchy or the number of lower levels in the top level of the hierarchy.

21. The computer program product of claim 19 further comprising instructions for:
  identifying types for the skills; and
  displaying the skills identified in the radar chart in regions based on the types identified for the skills, wherein each region corresponds to a type in the types.

22. The computer program product of claim 19, wherein the group of people is a first group of people, the balance of skills is a first balance of skills, the radar chart is a first radar chart, and further comprising instructions for:
  identifying the skills for a second group of people;
  displaying the skills identified for the second group of people on a second radar chart in the graphical user interface, wherein the first radar chart and the second radar chart are displayed in the graphical user interface concurrently;
  identifying a second balance of skills for the second group of people, wherein the second balance of skills has the desired values for the skills needed for the second group of people; and
  displaying the second balance of skills for the second group of people in the second radar chart.

23. The computer program product of claim 19, wherein the group of people is a first group of people and further comprising instructions for:
  displaying a control on the graphical user interface for at least one of adding a set of people to the first group of people or removing the set of people from the first group of people to form a second group of people, wherein the control includes a list of people of an organization that is not in the first group of people;
  identifying amounts of change in the balance of skills for the first group of people for each person in the list of people added to the first group of people; and
  sorting the list of people in the control based on the amounts of change in the balance of the skills.

24. The computer program product of claim 23, wherein the balance of skills is a first balance of skills and further comprising instructions for:
  creating the second group of people based on user input to the control moving the set of people from the list of people to the first group of people; and
  displaying a second balance of skills for the second group of people in the radar chart.

25. The computer program product of claim 19, further comprising instructions for:
  identifying a candidate that has skills that have values that are desired values; and
  adding the candidate to the group of people.

* * * * *